United States Patent
Hu et al.

(10) Patent No.: US 11,320,859 B2
(45) Date of Patent: May 3, 2022

(54) HEAD-MOUNTED DISPLAY DEVICE

(71) Applicants: K-Tronics (Suzhou) Technology Co., Ltd., Jiangsu (CN); BOE Technology Group Co., Ltd., Beijing (CN)

(72) Inventors: Yiping Hu, Beijing (CN); Ronghui Lin, Beijing (CN); Baohua Tang, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/887,871

(22) Filed: May 29, 2020

(65) Prior Publication Data

US 2021/0157358 A1 May 27, 2021

(30) Foreign Application Priority Data

Nov. 21, 2019 (CN) .......................... 201922026202.4

(51) Int. Cl.
*G06F 1/16* (2006.01)

(52) U.S. Cl.
CPC .................................... *G06F 1/163* (2013.01)

(58) Field of Classification Search
CPC ...................................................... G06F 1/163
See application file for complete search history.

(56) References Cited

U.S. PATENT DOCUMENTS

| 10,353,206 | B2* | 7/2019 | Guo ...................... H04R 5/0335 |
| 10,617,025 | B1* | 4/2020 | Chen ................... H05K 5/0086 |
| 2019/0212772 | A1* | 7/2019 | Chen ...................... G06F 1/163 |
| 2019/0266798 | A1* | 8/2019 | Ngai ................... G06K 9/00355 |
| 2020/0050235 | A1* | 2/2020 | Yoon ...................... G06F 1/163 |

* cited by examiner

*Primary Examiner* — Rockshana D Chowdhury
(74) *Attorney, Agent, or Firm* — Nath, Goldberg & Meyer; Joshua B. Goldberg

(57) ABSTRACT

The present disclosure provides a head-mounted display device, including a head-mounted part and a display part. The head-mounted display device further includes a rotation connecting assembly respectively connected to the head-mounted part and the display part, and configured to make the display part rotatable in a direction toward or away from a user face relative to the head-mounted part.

9 Claims, 4 Drawing Sheets

HEAD-MOUNTED DISPLAY DEVICE

CROSS-REFERENCE TO RELATED APPLICATION

The present application claims priority from Chinese patent application No. 201922026202.4 filed with China National Intellectual Property Administration (CNIPA) on Nov. 21, 2019, the disclosure of which is incorporated herein by reference.

TECHNICAL FIELD

The present disclosure relates to the technical field of display devices, and particularly relates to a head-mounted display device.

BACKGROUND

A head-mounted display refers to a device that can guide video or image light emitted from a micro image display (e.g., a transmissive or reflective liquid crystal display screen, an organic electroluminescent device, a Digital Micromirror Device (DMD), etc.) to a user's pupil by the optical technology, and that can implement virtual or magnified image in a near-eye range of a user to provide visual and visible images, videos, text messages and the like for the user.

However, current head-mounted displays cannot adapt to different users, thereby failing to meet the requirements of different crowds and having low wearing comfort and poor experience effect.

SUMMARY

To solve at least one of the problems in the related art, the present disclosure provides a head-mounted display device that can adapt to different users, meet the requirements of different crowds, and improve the wearing comfort and experience effect.

The present disclosure provides a head-mounted display device, including a head-mounted part and a display part. The head-mounted display device further includes a rotation connecting assembly respectively connected to the head-mounted part and the display part, and configured to make the display part rotatable in a direction toward or away from a user face relative to the head-mounted part.

Optionally, the rotation connecting assembly includes a first connector, a rotation shaft and a second connector, wherein the first connector is connected to the head-mounted part, the second connector is connected to the display part, and the first connector and the second connector are connected to each other in a rotatable manner via the rotation shaft.

Optionally, the first connector is provided with a through hole for the rotation shaft, the rotation shaft being rotatably inserted into the through hole and fixedly connected to the second connector.

Optionally, the rotation shaft includes a connecting plate portion and a shaft portion integrally provided, the connecting plate portion being provided at both ends of the shaft portion, the shaft portion being inserted into the through hole, and the connecting plate portion being fixedly connected to the second connector.

Optionally, the head-mounted part includes a head-mounted body, and a head-mounted connector respectively connected to the head-mounted body and the rotation connecting assembly.

Optionally, the display part is provided with a mounting slot in which the rotation connecting assembly is disposed.

Optionally, the head-mounted display device further includes a lid covering a notch of the mounting slot and provided with an opening via which the rotation connecting assembly extends out of the mounting slot to be connected to the head-mounted part.

Optionally, the head-mounted display device further includes a lid covering a notch of the mounting slot and provided with an opening via which the head-mounted part extends into the mounting slot to be connected to the rotation connecting assembly.

Optionally, the second connector is a rotation shaft seat made of a metal material.

Optionally, a connected portion of the head-mounted connector and the rotation connecting assembly is made of a metal material.

Optionally, the display part and the head-mounted part are rotatable relative to each other by an angle of 30°.

BRIEF DESCRIPTION OF THE DRAWINGS

Accompanying drawings are provided for further understanding of this disclosure and constitute a part of the description. Hereinafter, these drawings are intended to explain the disclosure together with the following exemplary embodiments, but should not be considered as a limitation of the disclosure. In the drawings.

DETAILED DESCRIPTION OF THE EMBODIMENTS

Hereinafter, specific embodiments of the present disclosure will be described with respect to the accompanying drawings. It will be appreciated that the specific embodiments as set forth herein are merely for the purpose of illustration and explanation of the disclosure and should not be constructed as a limitation thereof.

As shown in FIGS. 1 to 6, in an embodiment of the present disclosure, there is provided a head-mounted display device, including a head-mounted part and a display part 2. The head-mounted display device further includes a rotation connecting assembly respectively connected to the head-mounted part and the display part 2, and configured to make the display part 2 rotatable in a direction toward or away from a user face relative to the head-mounted part.

Specifically, the display part 2 may display an image, text or other information, the head-mounted part is configured to be fixed with a user head, and the rotation connecting assembly is self-rotatable and may be respectively connected to the head-mounted part and the display part 2. The head-mounted part is connected to the display part 2 via the rotation connecting assembly so that the head-mounted part and the display part 2 are rotatable relative to each other, and so that the display part 2 is rotatable in a direction toward or away from a user face relative to the head-mounted part. In this manner, a user, when wearing the head-mounted display device, can rotate the display part 2 according to his/her head size, visual condition or viewing habits, or other factors to adjust a distance of the display part 2 from the face so that different users can adjust a position of the display part 2 relative to the face according to their actual conditions when wearing the head-mounted display device, and so that the display part 2 is adjusted to the most suitable state of wearing, thereby adapting to different users, meeting the requirements of different crowds, and improving the wearing comfort and experience effect.

Figure 3:
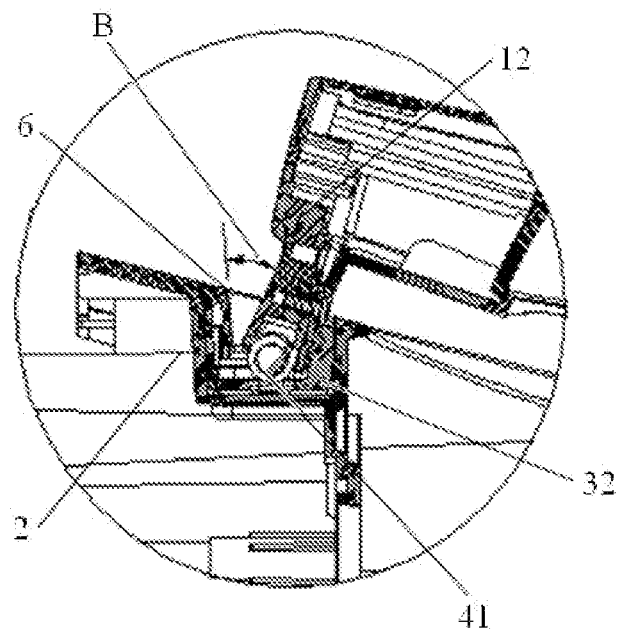
FIG. 3 is a schematic enlarged structural view of region A in FIG. 2.
Figure 4:
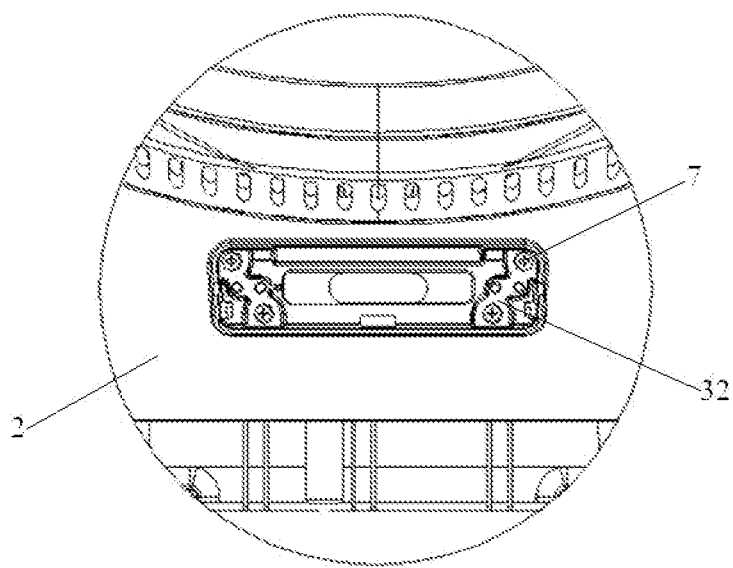
FIG. 4 is a schematic structural view of a second connector and a display part in the head-mounted display device provided in an embodiment of the disclosure.
Figure 5:
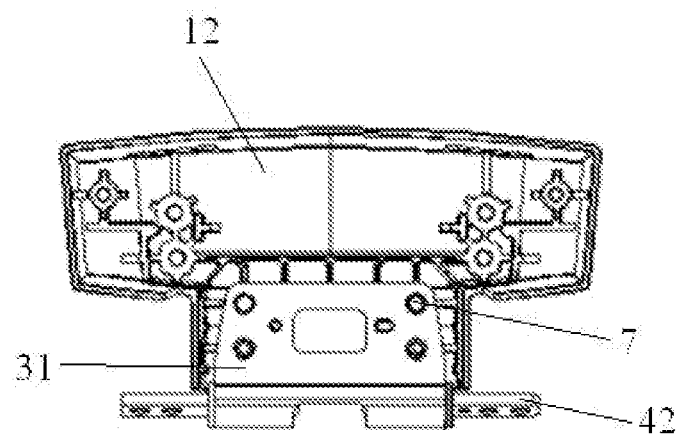
FIG. 5 is a schematic structural view of a head-mounted connector and a first connector in the head-mounted display device provided in an embodiment of the disclosure.
Figure 6:
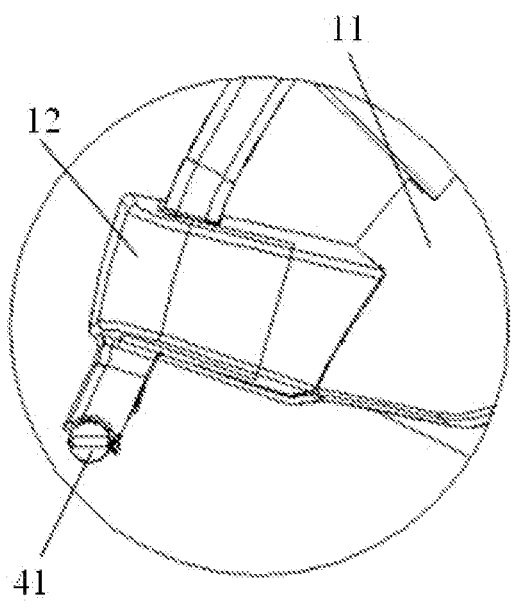
FIG. 6 is a schematic side structural view of the structure in FIG. 5.

In this embodiment, the display part 2 and the head-mounted part are rotatable relative to each other by an angle of 30° (e.g., angle B in FIG. 3). When the head-mounted display device is not worn by a user, the head-mounted part and the display part 2 are in their initial positions, and the user can rotate the head-mounted part or the display part 2 to enable relative rotation between the head-mounted part and the display part 2. The display part 2 being rotatable relative to the head-mounted part by an angle of 30° refers to the maximum angle at which a user can rotate the head-mounted part and the display part 2 relative to each other. However, the angle at which the display part 2 can be rotated relative to the head-mounted part is not limited thereto.

In this embodiment, the rotation connecting assembly includes a first connector 31, a rotation shaft and a second connector 32. The first connector 31 is connected to the head-mounted part, the second connector 32 is connected to the display part 2, and the first connector 31 and the second connector 32 are connected to each other in a rotatable manner via the rotation shaft.

Specifically, the first connector 31 is connected to the head-mounted part, the second connector 32 is connected to the display part 2, and the first connector 31 and the second connector 32 are connected to each other via the rotation shaft. Here, the first connector 31 and the second connector 32 being connected to each other in a rotatable manner via the rotation shaft may specifically refer to: at least one of the first connector 31 and the second connector 32 is rotatable about the rotation shaft. Thereby, the relative rotation of the head-mounted part and the display part 2 is realized. For example, when the first connector 31 is rotatable around the rotation shaft while the second connector 32 is fixedly connected to the rotation shaft, the user may rotate the head-mounted part connected with the first connector 31 to rotate the first connector 31 around the rotation shaft, so as to realize the relative rotation of the head-mounted part and the display part 2. Obviously, the user may also rotate the display part 2 connected with the second connector 32 to realize the relative rotation of the head-mounted part and the display part 2. Since the first connector 31 is rotatable around the rotation shaft, the rotation shaft is also rotatable relative to the first connector 31. Therefore, rotating the display part 2 can also realize the relative rotation of the head-mounted part and the display part 2. Therefore, when the second connector 32 is rotatable around the rotation shaft while the first connector 31 is fixedly connected to the rotation shaft, the relative rotation of the head-mounted part and the display part 2 can also be realized. Also, when both the first connector 31 and the second connector 32 are rotatable about the rotation shaft, the relative rotation of the head-mounted part and the display part 2 can also be realized.

In this embodiment, the first connector 31 is provided with a through hole for the rotation shaft, and the rotation shaft is rotatably inserted into the through hole and fixedly connected to the second connector 32. That is, in this embodiment, the first connector 31 is rotated around the rotation shaft, while the second connector 32 is fixedly connected to the rotation shaft. Specifically, the first connector 31 is provided with a through hole for the rotation shaft, and the rotation shaft is rotatably inserted into the through hole of the first connector 31 so that the rotation shaft can be rotated in the through hole, thereby realizing the rotation of the first connector 31 around the rotation shaft.

In this embodiment, the rotation shaft includes a connecting plate portion 42 and a shaft portion 41 integrally provided. The connecting plate portion 42 is provided at both ends of the shaft portion 41, the shaft portion 41 is inserted into the through hole, and the connecting plate portion 42 is fixedly connected to the second connector 32. Specifically, the shaft portion 41 is rotatably inserted into the through hole of the first connector 31, and the connecting plate portions 42 at both ends of the shaft portion 41 are fixedly connected to the second connector 32, so as to fixedly connect the shaft portion 41 to the second connector 32 (the rotation shaft 41 and the second connector 32 are relatively fixed) so that the first connector is rotatable relative to the second connector about the rotation shaft.

In this embodiment, the head-mounted part includes a head-mounted body 11, and a head-mounted connector 12 respectively connected to the head-mounted body 11 and the rotation connecting assembly. Specifically, the head-mounted body 11 is configured to be worn on a user head, and the head-mounted connector 12 is connected to the head-mounted body 11 and connected to the first connector 31, that is, the head-mounted body 11 and the first connector 31 are connected via the head-mounted connector 12.

In this embodiment, the display part 2 is provided with a mounting slot 5 in which the rotation connecting assembly is disposed, so as to prevent the rotation connecting assembly from being exposed outside of the display part 2 and influencing the overall appearance of the display part 2.

Figure 1:
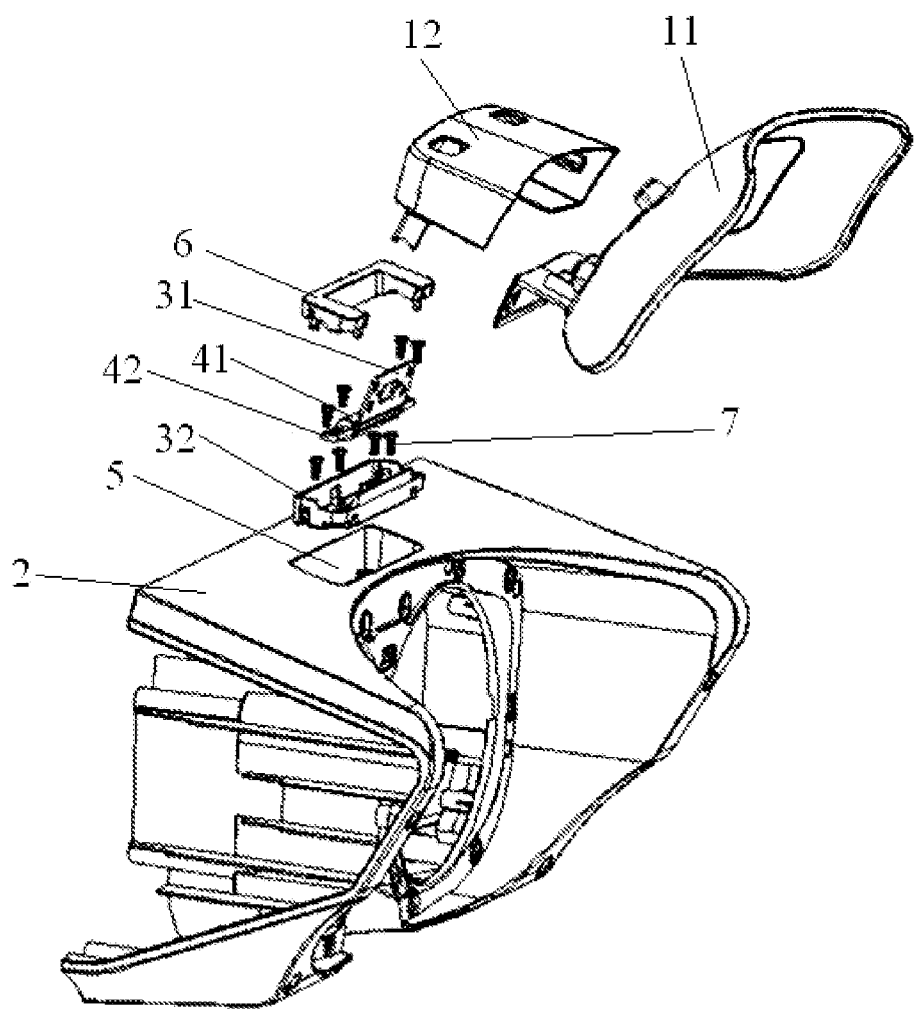
FIG. 1 is a schematic structural view of a head-mounted display device provided in an embodiment of the present disclosure.
Figure 2:
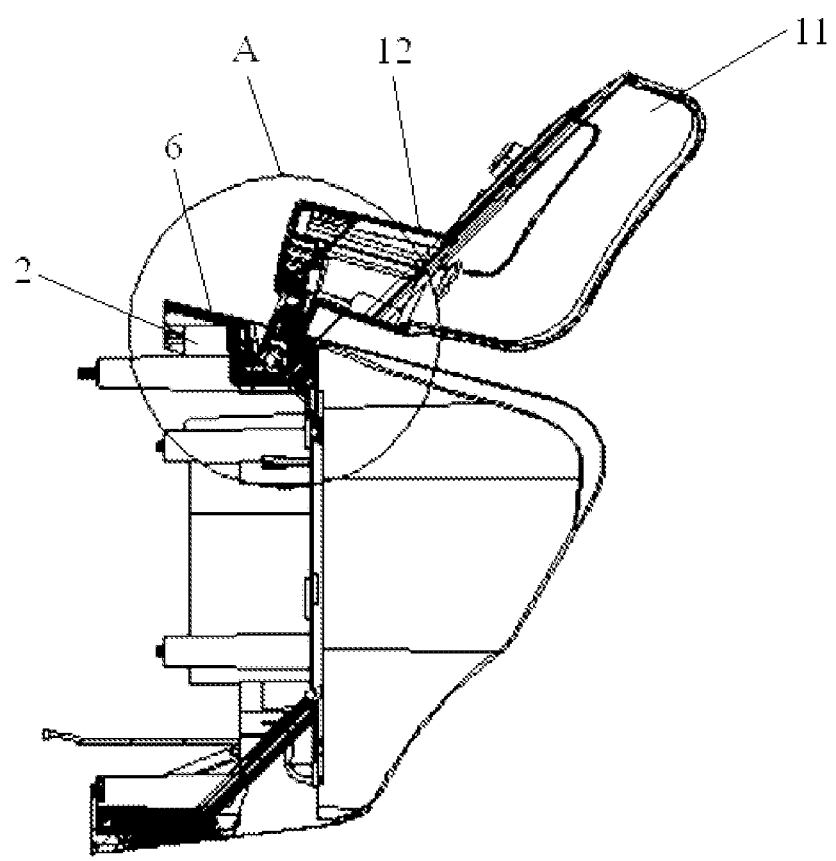
FIG. 2 is a schematic side structural view of a head-mounted display device provided in an embodiment of the disclosure.

Specifically, as shown in FIG. 1, the second connector 32 and the rotation shaft are both located in the mounting slot 5. A threaded hole is provided at a bottom of the mounting slot 5, and a hole for a bolt 7 in threaded fit with the threaded hole to pass through is provided in the second connector 32. The bolt 7 passes through the hole in the second connector 32 to be screwed into the threaded hole of the mounting slot 5, so as to fix the second connector 32 in the mounting slot 5. In addition, the connecting plate portion 42 of the rotation shaft may also be fixedly connected to the second connector 32 via the bolt 7 to fix the rotation shaft and the second connector 32 into the mounting slot 5 together. In addition, the first connector 31 and the head-mounted connector 12 may also be connected via the bolt 7. However, the connection manners of the second connector 32 and the mounting slot 5, of the rotation shaft and the second connector 32, and of the first connector 31 and the head-mounted connector 12 are not limited thereto.

In this embodiment, the head-mounted display device further includes a lid 6 covering a notch of the mounting slot 5 and provided with an opening via which the rotation connecting assembly extends out of the mounting slot 5 to be connected to the head-mounted part, or, via which the head-mounted part extends into the mounting slot 5 to be connected to the rotation connecting assembly.

Specifically, the lid 6 covering the notch of the mounting slot 5 can further improve the overall appearance of the display part 2. As shown in FIG. 1, for example, the lid 6 covers at least the connecting plate portion and part of the shaft portion of the rotation shaft. The opening on the lid 6 is provided to allow the first connector 31 to extend out of the mounting slot 5 via the opening to be connected to the head-mounted connector 12, or, to allow the head-mounted connector 12 to extend into the mounting slot 5 via the opening to be connected to the first connector 31.

In this embodiment, the second connector 32 may be a rotation shaft seat made of a metal material. When a user rotates the head-mounted part or the display part 2 connected with the second connector 32, the second connector 32 will experience a rotating torsion, and after the user wears the head-mounted display device, the second connector 32 will experience the rotating torsion for a long time. By means of the second connector 32 made of a metal material, the stress strength of the second connector 32 can be effectively enhanced, so as to prevent deformation and fracture of the second connector 32 under stress, thereby enhancing the stress strength of the head-mounted display device, and improving use stability of the head-mounted display device.

In this embodiment, a connected portion of the head-mounted connector 12 and the rotation connecting assembly is made of a metal material. When a user rotates the display part 2 or the head-mounted body 11 connected with the head-mounted connector 12, the head-mounted connector 12 will experience a rotating torsion, and after the user wears the head-mounted display device, the head-mounted connector 12 will experience the rotating torsion for a long time. By means of the head-mounted connector 12 made of a metal material, the stress strength of the head-mounted connector 12 can be effectively enhanced, so as to prevent deformation and fracture of the head-mounted connector 12 under stress, thereby enhancing the stress strength of the head-mounted display device, and improving use stability of the head-mounted display device.

To sum up, the head-mounted display device provided in the embodiments of the disclosure can adapt to different users, meet the requirements of different crowds, and improve the wearing comfort and experience effect.

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A head-mounted display device, comprising a head-mounted part and a display part, wherein the head-mounted display device further comprises a rotation connecting assembly respectively connected to the head-mounted part and the display part, and configured to make the display part rotatable in a direction toward or away from a user face relative to the head-mounted part,
    wherein the display part has a mounting slot in which the rotation connecting assembly is disposed, and
    wherein the head-mounted display device further comprises a lid covering a notch of the mounting slot and provided with an opening via which the rotation connecting assembly extends out of the mounting slot to be connected to the head-mounted part.

2. The head-mounted display device according to claim 1, wherein the rotation connecting assembly comprises a first connector, a rotation shaft and a second connector, wherein the first connector is connected to the head-mounted part, the second connector is connected to the display part, and the first connector and the second connector are connected to each other in a rotatable manner via the rotation shaft.

3. The head-mounted display device according to claim 2, wherein the first connector is provided with a through hole for the rotation shaft, the rotation shaft being rotatably inserted into the through hole and fixedly connected to the second connector.

4. The head-mounted display device according to claim 3, wherein the rotation shaft comprises a connecting plate portion and a shaft portion integrally provided, the connecting plate portion being provided at both ends of the shaft portion, the shaft portion being inserted into the through hole, and the connecting plate portion being fixedly connected to the second connector.

5. The head-mounted display device according to claim 1, wherein the head-mounted part comprises a head-mounted body, and a head-mounted connector respectively connected to the head-mounted body and the rotation connecting assembly.

6. The head-mounted display device according to claim 1, wherein the head-mounted display device further comprises a lid covering a notch of the mounting slot and provided with an opening via which the head-mounted part extends into the mounting slot to be connected to the rotation connecting assembly.

7. The head-mounted display device according to claim 2, wherein the second connector is a rotation shaft seat made of a metal material.

8. The head-mounted display device according to claim 5, wherein a connected portion of the head-mounted connector and the rotation connecting assembly is made of a metal material.

9. The head-mounted display device according to claim 1, wherein the display part and the head-mounted part are rotatable relative to each other by an angle of 30°.

* * * * *